(12) United States Patent
Bott

(10) Patent No.: US 6,397,914 B1
(45) Date of Patent: Jun. 4, 2002

(54) APPARATUS FOR CONTINUOUS PRODUCTION OF LIGHTWEIGHT COMPOSITE BEAMS

(75) Inventor: Richard Bott, Pearblossom, CA (US)

(73) Assignee: Lockheed Martin Corporation, Palmdale, CA (US)

( * ) Notice: Subject to any disclaimer, the term of this patent is extended or adjusted under 35 U.S.C. 154(b) by 0 days.

(21) Appl. No.: 09/655,799

(22) Filed: Sep. 6, 2000

Related U.S. Application Data

(62) Division of application No. 09/240,400, filed on Jan. 29, 1999, now Pat. No. 6,264,781.

(51) Int. Cl.[7] .............................. B32B 5/00; E04C 3/00
(52) U.S. Cl. .................. 156/436; 156/441; 156/555; 156/178; 156/182; 156/259; 156/27; 52/631; 52/745.17; 52/745.19; 264/152; 264/164; 264/257; 264/258; 264/171.26
(58) Field of Search ............................. 156/166, 176, 156/177, 178, 180, 182, 259, 271, 436, 437, 441, 555; 264/164, 152, 171.26, 257, 258; 52/631, 745.17, 745.19

(56) References Cited

U.S. PATENT DOCUMENTS

| 4,394,338 A | * | 7/1983 | Fuwa | 264/135 |
| 4,445,957 A | * | 5/1984 | Harvey | 156/180 |
| 5,174,844 A | * | 12/1992 | Tong | 156/180 |
| 5,264,170 A | * | 11/1993 | Strachan | 264/70 |
| 5,996,305 A | * | 12/1999 | Holbert et al. | 52/745.19 |

* cited by examiner

Primary Examiner—Linda Gray
(74) Attorney, Agent, or Firm—Robert A. Schruhl

(57) ABSTRACT

An apparatus for continuously producing composite structural beams is disclosed. The invention includes novel apparatus for producing a continuous lightweight composite beam by combining solid pultruded cap sections with composite sandwich panels. The invention further provides novel means by which pultruded composite tubular structural elements can be made of composite materials, wherein the tubular elements include solid pultruded corners.

4 Claims, 2 Drawing Sheets

APPARATUS FOR CONTINUOUS PRODUCTION OF LIGHTWEIGHT COMPOSITE BEAMS

REFERENCE TO RELATED APPLICATIONS:

This is a divisional application of U.S. patent application Ser. No. 09/240,400 filed Jan. 29, 1999 now U.S. Pat. No. 6,264,781.

BACKGROUND OF THE INVENTION

1. Field of the Invention

The present invention relates generally to processes for forming composite beams and configurations of such beams, and more particularly to a process for continuously forming composite beam structures of predetermined cross-sectional shapes.

2. Description of Related Art

The use of pultrusion methods to effect the continuous production of structural members of constant cross-sectional configuration is well-known. Conventional pultrusion processes involve drawing a bundle of reinforcing material, such as glass filaments or fibers, from a source, wetting the fibers and impregnating them with a resin, as for example passing them through a bath in a reservoir, pulling the resin-impregnated fibers through a shaping die to align the fibers and manipulate the bundle to a desired cross-sectional configuration, and then curing the fibers in a mold while maintaining tension on the filaments. Because the fibers progress completely through the pultrusion process without being cut or chopped, the resulting products have exceptionally high longitudinal strength. Examples of processes of this type are disclosed in U.S. Pat. No. 3,793,108 to Goldsworthy, U.S. Pat. No. 4,394,338 to Fuway, U.S. Pat. No. 4,445,957 to Harvey, U.S. Pat. No. and 5,174,844 to Tong.

Articles that are produced by the pultrusion process include tool handles, mine shaft bolts, pipes, tubing, channel beams, fishing rods, etc. Of particular interest in this application are structural members.

U.S. Pat. No. 5,264,170 to Strachan discloses a system of manufacturing pultruded elements having a skin resin-bonded to a core, the elements preferably being tubular and having internal and external skins resin-bonded to the core. The process disclosed by Strachan comprises separately feeding core-forming materials and skin-forming materials along substantially vertical pathways to the inlet of a pultrulsion die station. The external and internal cross-sectional configuration of the elements is determined by the dies at the die station. External and internal skins are secured over the element to yield a tubular element.

It is also known in this technology that the size of pultruded parts is limited due to the high pull forces required to keep the materials moving through the die. There is no known method for producing lightweight composite beams without costly and time consuming secondary joining processes.

Against this background of known technology, the inventors have developed a process for the automated, continuous, formation of lightweight, composite structural elements which are structurally efficient and of superior quality.

OBJECTS AND SUMMARY OF THE INVENTION

It is therefore an object of the present invention to provide a novel method for producing lightweight structural elements comprised of composite materials, while overcoming many of the disadvantages and drawbacks of similar previously known techniques.

Yet another object of the present invention is to provide a novel method for producing a continuous lightweight composite beam by combining solid pultruded cap sections with composite sandwich panels.

Still another object of the invention is to provide pultruded composite tubular structural elements made of composite materials, wherein the tubular elements include solid pultruded corners.

DETAILED DESCRIPTION OF THE INVENTION

The following description is provided to enable any person skilled in the art to make and use the invention, and sets forth the best modes contemplated by the inventor of carrying out his invention.

Variations, however, may be readily apparent to those skilled in the art, since only the generic principles of the present invention have been defined herein specifically to provide teachings for a pultrusion process for continuously producing tubular structural beam elements having sandwich panels secured between spaced corner caps.

Figure 1:
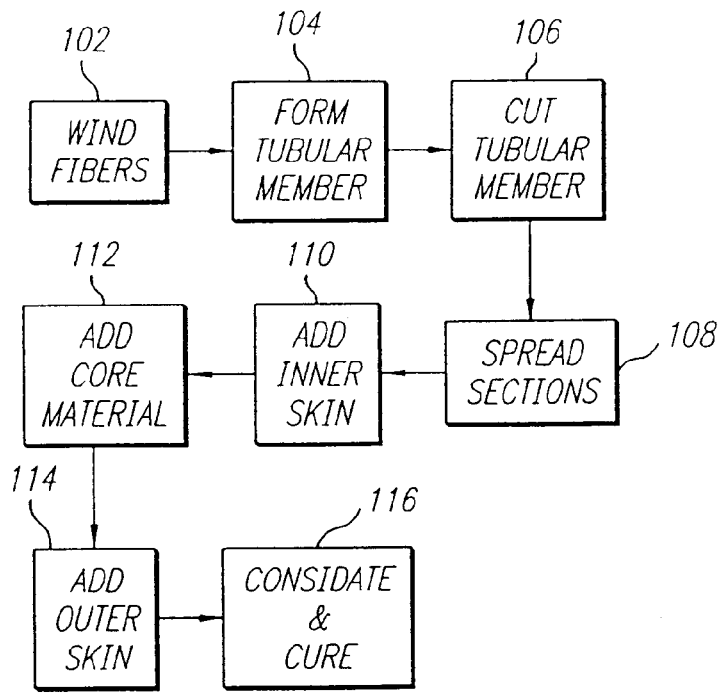
FIG. 1 is a schematic diagram illustrating the preferred process of the present invention.
Figure 2:
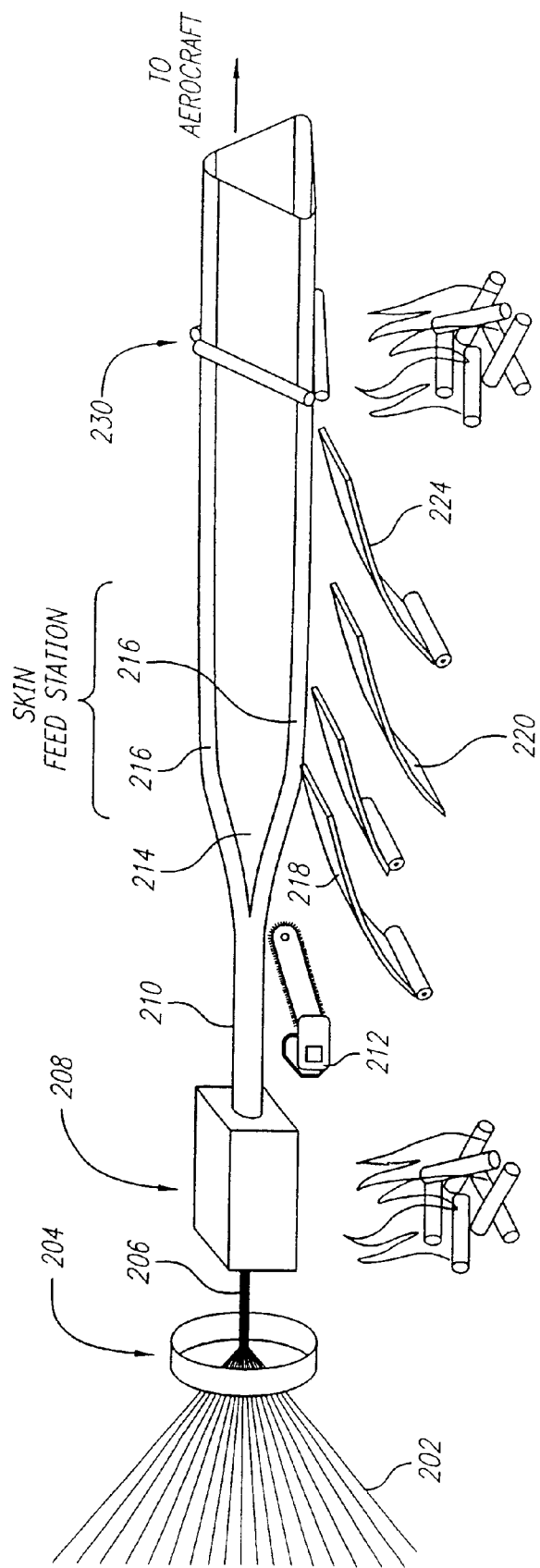
FIG. 2 is a schematic diagram illustrating apparatus used in carrying out the steps of the process illustrated in FIG. 1.

Referring now to FIGS. 1 and 2, a preferred process in accordance with the present invention includes a series of steps 102–114 by which the tubular composite pultruded beams can be continuously produced.

In the first step 102, dry fibers 202 are drawn from supply sources (not shown) through an off-axis winding apparatus 204 to produce an elongated wound fiber element 206.

In the second step 104, the elongated fiber element 206 is passed through a pultrusion die 208 where the fiber element is formed into a tubular member 210 of relatively small diameter. Heat is typically used in effecting pultrusion at the die 208.

In the third step 106, the tubular member 210 is cut at spaced locations by a slitting apparatus 212 to provide axially continuous slits 214 along the running length of the tubular member 210. The sections 216 of the tubular member disposed between the slits 214 constitute the corner caps of the ultimately-formed structural beam. The cuts or slits 214 in the tubular member 210 can be adjusted during production of the beam to alter either the geometry of the final beam or the distribution of material between the corners of the beam.

The fourth step 108 involves spreading the sections of the tubular member 210 between the slits 214 apart to predetermined positions for the contemplated final beam product. Cylindrical configurations for the tubular member 210 are particularly useful insofar as the cylindrical shape can be easily divided into three pieces for triangular beams, four pieces for rectangular beams, five pieces for pentagonal shaped beams, etc. In some applications, it will be desirable to obtain equal sections for equilateral cross-section beams, while in other applications, other proportions for irregularly shaped beams can be used.

The fifth step of the inventive process 110 involves feeding an inner skin 218 between each pair of adjacent corner caps. The inner skin can be a pre-cured laminate, a dry fabric including unidirectional fibers, or a preimpregnated material. Resin baths, sprays, or rollers can be used for applying a wetting substance where dry fabric is used.

In a sixth step 112, core material 220 is fed from supply apparatus, to the outside of the inner skin 218 so that the core material is applied over the exterior of the inner skin. The core material can be metal or composite honeycomb, or foam. Honeycomb can be expenaded as it is fed onto the inner skin, thereby saving space on the production line. Foam could either be fed in sheets and bonded at the ends as it enters the production line, or it could be manufactured in a continuous process as it is fed onto the production line, thereby eliminating the need for core splices. Variable cross-sections or geometry of either honeycomb or foam could be used where bend and twist will be imparted to the final cured beam. Film adhesive could be fed into the production line to adhere the core material to the inner skins.

In a seventh step 114, outer skin material 224 is applied to the exterior of the core material. Preferably, the outer skin is a precured laminate, or a dry fabric containing unidirectional fibers, or preimpregnated material. Resin baths, sprays, rollers, or film adhesives could all be used to wet out the outer skin and adhere it to the core material. The outer skin could also be applied by overwinding the entire beam with dry or preimpregnated unidirectional fiber tows.

In an eighth step 116, the now nearly-formed beam is passed through a consolidation station 230 where the inner and outer skins are consolidated and secured to the core material and the corner caps. This process is tailored to the materials used, typically adding heat and pressure applied through the use of opposing rollers, or via tractor belts on the inside and outside of the beam. The use of several rollers or belts with adjustable positions allows variable twist and bending to be induced in the beam prior to final curing of the caps, core and skins.

Figure 3:
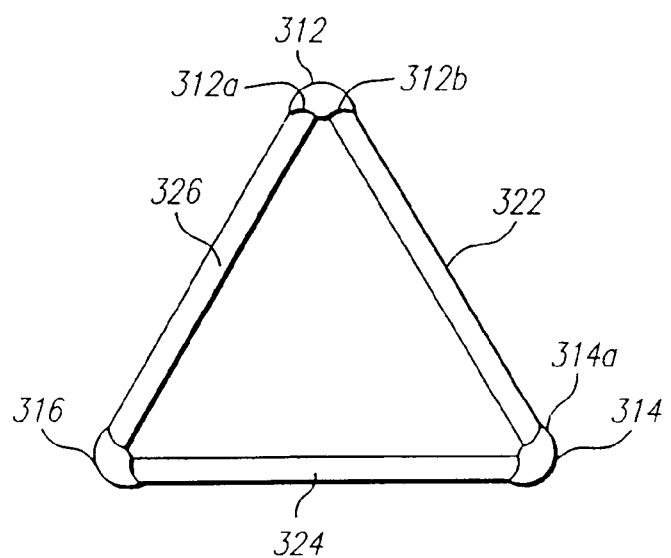
FIG. 3 is a cross-section of an exemplary pultruded element made in accordance with the teachings of the present invention.

FIG. 3 shows a cross-section of a triangular beam 300 produced by the apparatus and method of the present invention. As seen, the beam comprises three corner caps 312, 314, 316 separated from one another, and maintained in such separated state, by three sandwich panels 322, 324, 326, each interconnecting a pair of facing edges (eg., edges 312b and 314a) on adjacent corner caps. The beam produced according to the present invention can be of any cross-sectional shape, polygonal or not.

The composite beams thus produced are inherently structurally efficient due to the solid composite corner caps which are made from a single pultrusion. The corner caps are maintained in a separated and stable state by placement of the sandwich panels between adjacent corner caps. Outstanding features of the beam obtained by the present invention include variable corner angles, variable cross-sectional areas of the corner caps, and variable twist and bending in the beam.

Those skilled in the art will appreciate that various adoptions and modifications of the invention as described above can be configured without departing from the scope and spirit of the invention. Therefore, it is to be understood that, within the scope of the appended claims, the invention may be practiced other than as specifically described herein.

What I claim is:

1. Apparatus for continuously producing composite structural beams, comprising:

Means for forming a tubular element from fibers of composite material, means for separating the tubular element into longitudinally extensive, circumstantially separated, comer caps, means for securing sandwich panels between adjacent corner caps to form a tubular beam, means for shaping the tubular beam, and means for curing said shaped tubular beam, wherein said cured tubular beam provides said composite beam.

2. The apparatus of claim 1, wherein said means for forming a tubular element from fibers of composite material further includes fiber supply means and fiber winding means.

3. The apparatus of claim 1, wherein said means for separating the tubular element into longitudinally extensive, circumferentially separated, comer caps comprises slitter means positioned adjacent said tubular element.

4. The apparatus of claim 1, wherein said means for shaping said tubular element comprises means for consolidating said comer caps and sandwich panels.

* * * * *